(12) United States Patent
Mao

(10) Patent No.: US 9,479,004 B2
(45) Date of Patent: Oct. 25, 2016

(54) BUCK/BOOST CIRCUIT THAT CHARGES AND DISCHARGES MULTI-CELL BATTERIES OF A POWER BANK DEVICE

(71) Applicant: Active-Semi, Inc., Tortola (VG)

(72) Inventor: Hong Mao, Allen, TX (US)

(73) Assignee: Active-Semi, Inc. (VG)

( * ) Notice: Subject to any disclaimer, the term of this patent is extended or adjusted under 35 U.S.C. 154(b) by 131 days.

(21) Appl. No.: 14/657,589

(22) Filed: Mar. 13, 2015

(65) Prior Publication Data

US 2016/0268816 A1 Sep. 15, 2016

(51) Int. Cl.
*H02J 7/00* (2006.01)

(52) U.S. Cl.
CPC ............. *H02J 7/007* (2013.01); *H02J 7/0013* (2013.01)

(58) Field of Classification Search
CPC ...................................... H02J 7/007
USPC ....................................... 320/136
See application file for complete search history.

(56) References Cited

U.S. PATENT DOCUMENTS

| | | | | |
|---|---|---|---|---|
| 6,314,007 B2* | 11/2001 | Johnson, Jr. | ............... | 307/66 |
| 6,873,134 B2* | 3/2005 | Canter | ................. | H02J 7/0021 320/118 |
| 7,372,709 B2* | 5/2008 | Mazumder | ............... | H02J 3/387 363/132 |
| 2009/0296442 A1* | 12/2009 | Chang | .................... | H02J 7/0054 363/142 |
| 2012/0176088 A1* | 7/2012 | Lee | .......................... | H02J 3/383 320/128 |
| 2013/0214733 A1* | 8/2013 | Liang | ..................... | H02J 7/0014 320/108 |

* cited by examiner

*Primary Examiner* — Yalkew Fantu
(74) *Attorney, Agent, or Firm* — Imperium Patent Works; T. Lester Wallace

(57) ABSTRACT

A power bank device has a single circuit topology involving a DC-to-DC converter and four transistors so that this single topology can be used both to charge battery cells with a regulated current in a charging step-up boost mode and to drive a regulated voltage onto a power bank voltage output node in a discharging step-down buck mode. In one example, the circuit includes a first transistor coupled to conduct current between a battery voltage node and a switch node SW, a second transistor coupled to conduct current between the SW node and a ground node, and third and fourth transistors coupled in series to conduct current between a voltage input node and the voltage output node. The inductor of the converter is coupled between the SW node and the voltage output node, and the output capacitor of the converter is coupled between the voltage output node and the ground node.

20 Claims, 9 Drawing Sheets

POWER BANK WITH LIGHT LOAD DETECTION

POWER BANK WITH LIGHT LOAD DETECTION

DETAIL OF THE VREF GEN
AND CURRENT SOURCE

ENABLE CIRCUITRY IN
DC-TO-DC CONVERTER
CONTROL

DETAIL OF THE VOLTAGE
CLAMP CIRCUIT

DETAIL OF THE TIMER

DETAIL OF THE DC-TO-DC
CONVERTER CONTROL CIRCUIT

STATE MACHINE

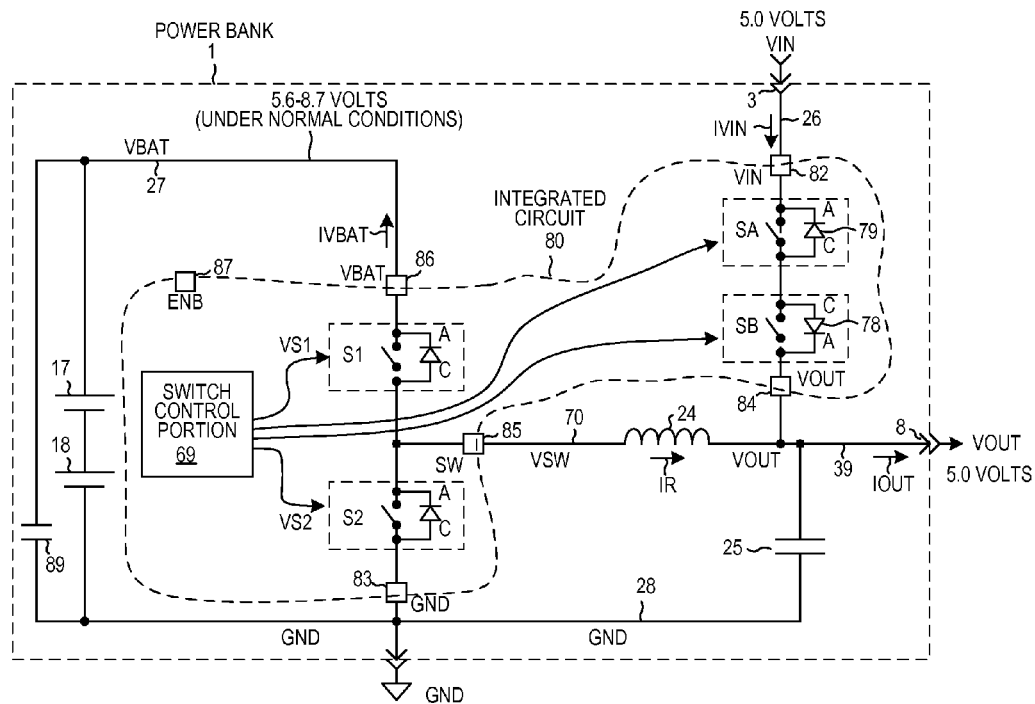

POWER BANK CIRCUIT TOPOLOGY ONE TO CHARGE AND
DISCHARGE DUAL-CELL BATTERIES

FIG. 9

|  | S1 | S2 | SA | SB |
|---|---|---|---|---|
| DISCHARGING MODE<br>VBAT=5.6V-8.7V VOUT=5V | PWM<br>BUCK | PWM<br>BUCK | OFF | OFF |
| DISCHARGING MODE<br>VBAT<5.6V | OFF | OFF | OFF | OFF |
| CHARGING MODE<br>VIN=5V VBAT=5.6V-8.7V | PWM<br>BOOST | PWM<br>BOOST | ON | ON |
| CHARGING MODE<br>VBAT<5.6V | OFF | OFF | OFF | OFF |
| DISABLED MODE | OFF | OFF | OFF | OFF |

OPERATION OF THE TRANSISTORS OF FIG. 9

FIG. 10

POWER BANK CIRCUIT TOPOLOGY TWO TO CHARGE AND
DISCHARGE DUAL-CELL BATTERIES

|  | S1 | S2 | SA | SB |
|---|---|---|---|---|
| DISCHARGING MODE | PWM BUCK | PWM BUCK | OFF | ON |
| CHARGING MODE (WITH BYPASS) | PWM BOOST | PWM BOOST | ON | OFF |
| CHARGING MODE (NO BYPASS) | PWM BOOST | PWM BOOST | ON | ON |
| DISABLED MODE | OFF | OFF | OFF | OFF |

OPERATION OF THE TRANSISTORS OF FIG. 13

POWER BANK CIRCUIT TOPOLOGY TWO TO CHARGE AND
DISCHARGE DUAL-CELL BATTERIES

|  | S1 | S2 | SA |
|---|---|---|---|
| DISCHARGING MODE | PWM BUCK | PWM BUCK | OFF |
| CHARGING MODE | PWM BOOST | PWM BOOST | ON |
| DISABLED MODE | OFF | OFF | OFF |

OPERATION OF THE TRANSISTORS OF FIG. 15

POWER BANK WITH LIGHT LOAD DETECTION

BUCK/BOOST CIRCUIT THAT CHARGES AND DISCHARGES MULTI-CELL BATTERIES OF A POWER BANK DEVICE

TECHNICAL FIELD

The present disclosure relates generally to battery charging and discharging in a power bank device, and to related structures and methods.

BACKGROUND INFORMATION

A device commonly referred to as a power bank includes a rechargeable battery, buck converter circuitry, boost converter circuitry, an input connector, and an output connector. In one conventional power bank, the rechargeable battery has an operating range from about 2.8 volts for a fully discharged battery to about 4.35 volts for a fully charged battery. If the battery is undesirably discharged, then an external DC power source can be plugged into the input connector of the power bank. The external DC power source supplies a DC voltage, such as 5.0 volts DC, onto the input connector of the power bank. Buck converter circuitry within the power bank receives the 5.0 volt power from the input conductor and bucks the voltage down and supplies a constant charging current to the battery at the lower battery voltage. As the battery charges, the battery voltage increases up to its fully charged battery voltage of 4.35 volts. Provided that the battery voltage is higher than the 2.8 volt fully uncharged battery value, the power bank is usable to supply a 5.0 volt output voltage to an external load device. To power the external load device, the external load device is plugged into the output connector. The boost converter circuitry with the power bank receives power from the rechargeable battery at the lower battery voltage, boosts the voltage up, and supplies a higher voltage regulated 5.0 volts out of the output connector and to the load device.

SUMMARY

A power bank device includes a voltage input (VIN) connector, a voltage output (VOUT) connector, a DC-to-DC switching converter, a plurality of battery cells coupled together in series, light load detection circuitry, a first plugged-in detector, a manual pushbutton, a second plugged-in detector, as well as other circuitry and components. In one example, the DC-to-DC switching converter includes a DC-to-DC converter control circuit as well as an inductor and an output storage capacitor. In one example, the light load detection circuitry includes a Voltage Detector and Disable Signal Generating Circuit (VDDSGC), a Voltage Reference Generator and Current Source Circuit (VRGCSC), and a voltage clamp circuit. The power bank device is operable in a charging mode, in a discharging mode, and in a disabled mode.

In the charging mode, an input supply current IVIN is received via the VIN input connector of the power bank device, and this IVIN powers the DC-to-DC converter. The DC-to-DC converter in turn supplies a regulated charging current IVBAT to the battery cells, thereby charging the battery cells via a VBAT node. A bypass current path is also provided from the VIN input connector to the VOUT output connector so that an external load device coupled to the VOUT output connector can be powered during the charging operation from the IVIN supply current received via the VIN input connector. Of importance, the battery cells together have a battery operating voltage range that ranges from a battery fully uncharged operating voltage VBATL (for example, 5.6 volts) to a battery fully charged operating voltage VBATH (for example, 8.7 volts), and this battery voltage on the VBAT node is higher than the VOUT output voltage (for example, 5.0 volts) that is output onto the VOUT output connector. In the charging mode, the VIN input voltage (for example, 5.0 volts) on the VIN input connector that powers the DC-to-DC converter is less than the battery fully uncharged operating voltage VBATL. The DC-to-DC converter therefore operates in the boost step-up mode during charging mode operation.

In the discharging mode, a supply current IVBAT from the battery cells is used to power the DC-to-DC converter such that the DC-to-DC converter drives the VOUT output connector with a regulated output voltage VOUT (for example, 5.0 volts). In the discharging mode, the VIN input connector is decoupled from the VOUT output connector. Of importance, the battery voltage that powers the DC-to-DC converter during discharging mode operation is higher than the output voltage VOUT that is being driven onto the VOUT output connector.

In the disabled mode, the DC-to-DC converter is disabled from switching, and current does not flow through the inductor of the DC-to-DC converter. Current flow from the battery cells to either the VIN connector or the VOUT connector is blocked. Within a short amount of time of the power bank device being put into the disabled mode, no current IOUT is being output from the VOUT output connector. This prevents the battery cells from being inadvertently drained in a light load condition.

In a first novel aspect, in the discharging mode, the light load detection circuitry detects a light load condition in which only a very small amount of current is flowing out of the power bank device via the VOUT output connector. In this discharging mode, the voltage VOUT on the VOUT output connector and on the VOUT node is a regulated first voltage V1 (for example, 5.0 volts). If this light load condition is detected, then the DC-to-DC converter is disabled so that it stops switching, and so that it is disabled from supplying a sustained appreciable output current IOUT out of the VOUT connector. The DC-to-DC converter is made to stop operating in the discharging mode, and to start operating in the disabled mode.

In one example, the light load condition detection circuitry detects a light load condition by sourcing a constant current ITH onto the VOUT node when the power bank device is operating in the discharging mode and when the VOUT output connector is being driven with the first voltage V1 (for example, 5.0 volts) by the DC-to-DC converter. The DC-to-DC converter sources current onto the VOUT output connector to regulate the voltage on the VOUT connector, but does not sink current from the VOUT output connector. If the voltage VOUT on the VOUT output connector and VOUT node rises (because the current draw out of the VOUT node by an external load device is less than the current ITH being supplied onto the VOUT node) and exceeds a second voltage V2 (for example, 5.4 volts), then this condition is detected by the light load detection circuitry. Further rising of the voltage on the VOUT node above a higher voltage V3 (for example, 5.5 volts) is prevented by a voltage clamp circuit. The voltage clamp circuit clamps the voltage on the VOUT node so that it does not rise above the voltage V3. Meanwhile, the light load detection circuitry detects if the condition of the voltage on the VOUT node being greater than the second voltage V2 persists for more than a predetermined amount of time TD. If the light load detection circuitry detects this light load condition, then the light load detection circuitry asserts a disable signal. The disable signal is supplied to the DC-to-DC converter. In response to the asserting of the disable signal, the DC-to-DC converter circuit stops operating in the discharging mode, and begins operating in the disabled mode.

If the power bank device is operating in the disabled mode, and if the manual pushbutton is then pressed or if the first plugged-in detector detects that a plug has been plugged into the VOUT output connector, then the power bank device stops operating in the disabled mode and starts operating in the discharging mode. The second plugged-in detector detects if an AC adapter has been plugged into the VIN input connector. If the power bank device detects that an AC adapter has been plugged into the VIN input connector, then the power bank device begins operating in the charging mode. If the power bank device is operating in the charging mode and then the second plugged-in detector detects that the AC adapter is no longer plugged into the VIN input connector (for example, due to the external AC adapter becoming unplugged from the VIN input connector), then the power bank device is made to stop operating in the charging mode and to start operating in the discharging mode.

In a second novel aspect, a single power switch circuit topology involving four power transistors is used both to charge the battery cells with the regulated constant current in the charging step-down mode as described above, and to drive a regulated voltage VOUT onto the VOUT output connector in the discharging step-down mode as described above. In one example, the power switch circuit topology involves a first transistor S1, a second transistor S2, a third transistor SA, and a fourth transistor SB. Transistor S1 is coupled to conduct current between a battery voltage node VBAT and a switch node SW. Transistor S2 is coupled to conduct current between the switch node SW and a ground GND node. The transistors SA and SB are coupled together in series between a voltage input (VIN) node and a voltage output (VOUT) node. The built-in diodes of the transistors SA and SB are coupled together in back-to-back (either anode-to-anode, or cathode-to-cathode) fashion. The inductor of the DC-to-DC converter is coupled between the SW node and the VOUT node, and the output capacitor of the DC-to-DC converter is coupled between the VOUT node and the GND node. The battery cells, coupled together in series, supply their battery voltage VBAT onto the VBAT node. In the charging boost step-up mode, a lower voltage VIN on the VIN node is boosted by the DC-to-DC converter such that the charging current is supplied to the batteries via the VBAT node. The charging current is supplied onto the VBAT node when a higher voltage VBAT is present on the VBAT node. The transistors S1 and S2 are pulse-width modulated on and off. Transistors SA and SB are controlled to be on so that they provide a bypass current path from the VIN node, through the transistors SA and SB, to the VOUT output node. This allows a supply current to flow into the power bank device via the VIN node, and to power a load device from the VOUT node at the same time that the supply current flowing into the VIN node is also used to charge the battery cells. In the discharging buck mode, a higher battery voltage VBAT on the VBAT node is used to power the DC-to-DC converter to operate in a buck step-down mode such that the DC-to-DC converter drives a lower regulated voltage VOUT onto the VOUT node. The transistors S1 and S2 are pulse-width modulated on and off, whereas the transistors SA and SB are controlled to be off. In the disabled mode, all four transistors S1, S2, SA and SB are controlled to be off. Other novel circuit topologies are also described in the detailed description below.

A novel integrated circuit is disclosed that includes the light load detection circuitry, the four power transistors, and the DC-to-DC converter control circuit portion of the DC-to-DC converter.

The foregoing is a summary and thus contains, by necessity, simplifications, generalizations and omissions of detail; consequently is it appreciated that the summary is illustrative only. Still other methods, structures and details are set forth in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 9 is a circuit diagram of a first circuit topology in accordance with a second novel aspect.

FIG. 10 is a table that illustrates how the transistors of the first circuit topology of FIG. 9 are controlled.

DETAILED DESCRIPTION

Reference will now be made in detail to background examples and some embodiments of the invention, examples of which are illustrated in the accompanying drawings.

Figure 1:
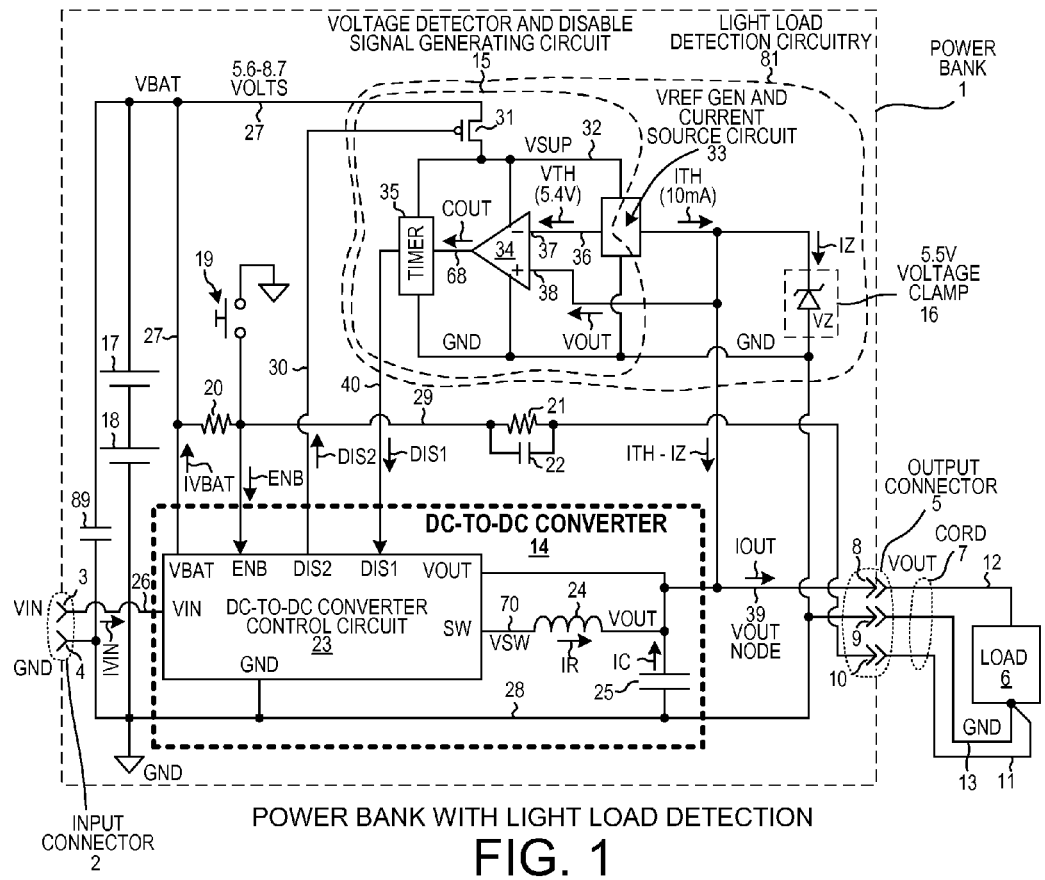
FIG. 1 is a circuit diagram of a power bank device that has novel light load detection circuitry in accordance with a first novel aspect.

FIG. 1 is a diagram of a power bank device 1. The power bank device 1 has an input connector 2 usable for coupling the power bank device 1 to a power source (for example, a source of 5.0 volt DC power) via a two-conductor cable. The two-conductor cable (not shown) has two conductors. A first conductor of the cord is to be removably coupled to the VIN connector contact 3 of the power bank device. The second conductor of the cord is to be removably coupled to the GND connector contact 4 of the power bank device. The input connector 2 may, for example, be a socket that receives and removably engages a plug on one end of the two-conductor cord. Through the input connector and cord, the power bank device 1 receives power from the external 5.0 volt DC power source (not shown). The external 5.0 volt DC power source is, in one example, what is commonly referred to as an "AC-to-DC adapter", or simply an "AC adapter".

The power bank device 1 also has an output connector 5 through which the power bank device 1 supplies power to a load device 6 through another cord 7. In one example, the output connector 5 is a Universal Serial Bus (USB) socket. The USB socket has three connector contacts: 1) a VOUT connector contact 8, a GND connector contact 9, and a USB ground connector contact 10. Cord 7 has a shield connector 11. This shield conductor 11 couples to the USB ground connector contact 10 when the USB plug on the end of the cord 7 is plugged into the output connector 5. The other end of the shield conductor 11 is coupled to the grounded case or enclosure of the load device 6. The other two conductors 12 and 13 of the cord 7 are the USB signal conductors, but these two USB signal conductors are used not to conductor signals in the circuit of FIG. 1 but rather are used to supply VOUT power from the power bank device 1, through the cord 7, and to the load device 6 as shown.

The power bank device 1 includes a DC-to-DC converter 14, a Voltage Detector and Disable Signal Generating Circuit (VDDSGC) 15, a voltage clamp circuit 16, two rechargeable 4000 mAh lithium-ion battery cells 17 and 18, a manual push button 19, a pull up resistor 20, an RC network involving resistor 21 and capacitor 22, and an input capacitor 89. The DC-to-DC converter 14, in turn includes a DC-to-DC converter control circuit 23, an inductor 24, and an output capacitor 25. As explained in further detail below, the DC-to-DC converter 14 is usable in a charging mode to receive 5.0 volt power via the input connector 2 and a VIN conductor 26 and to supply a charging current IVBAT through a VBAT node and conductor 27 to the battery cells 17 and 18, thereby charging the battery cells. The battery cells 17 and 18, in their fully charged states, provide a VBAT voltage of approximately 8.7 volts onto node and conductor 27. In this charging mode, the DC-to-DC converter 14 is supplying a regulated and controlled constant current to the charging battery cells as the voltage across the charging cells increases up to 8.7 volts.

The DC-to-DC converter 14 is also usable in a discharging mode. In this discharging mode the DC-DC converter 14 receives power from the battery cells 17 and 18 via the VBAT node and conductor 27 and drives an output voltage VOUT onto the output connector 5 and through cord 7 to the load device 6. In this discharging mode, the DC-to-DC converter 14 is supplying a regulated output voltage of 5.0 volts onto the output connector 5. The GND connector contact 4 of the input connector 2 is coupled via conductor 28 to the GND connector contact 9 of the output connector 5 as shown.

If the plug on the end of cord 7 is initially not plugged into the output connector 4, then initially a voltage across the capacitor 22 will be bled away via resistor 21. The initial voltage across capacitor 22 is therefore zero. The potential on the GND connector contact 10 will be the VBAT voltage. The voltage on the GND connector contact 10 of the power bank device will be the VBAT voltage by virtue of it being resistively coupled by resistors 21 and 20 to the VBAT node 27. If in this state the cord 7 is then plugged into the output connector 5, then the GND connector contact 10 of the power bank device will be coupled to the connector contact 9 by virtue of the connection in the load device, and the connector contact 9 is in turn is coupled to the GND node 28. The initial zero voltage across the capacitor 22 will cause the voltage on node and conductor 29 to transition from VBAT down to ground potential, because the voltage on the connector contact 10 transitions from VBAT to ground potential. The voltage on node 29 will then, however, transition back up from ground potential to a higher voltage as the capacitor 22 charges. The voltage to which capacitor 22 charges is determined by the voltage divider formed by resistors 21 and 20. The signal ENB on node 29 is therefore seen to pulse low below 0.8 volts when the cord 7 is plugged into the output connector 5, and then the voltage rises to the voltage divider voltage. The capacitor 22 is large enough to make sure that the period of time the ENB signal pulses low exceeds 30 milliseconds. A pulsing low of the ENB signal on node 29 for 30 milliseconds is detected by the DC-to-DC converter control circuit 23.

Alternatively, if the push button 19 is pressed, then node 29 is coupled to ground. This causes the voltage on node 29 to drop to zero. When the push button 19 is released, then the voltage on node 29 is pulled back up to the VBAT voltage due to pull up resistor 20. The resulting pulsing low of the voltage on node 29 is detected by the DC-to-DC converter control circuit 23. As explained in further detail below, if the DC-to-DC converter 14 is initially in a disabled state such that it is not switching and is not operating as a switching converter, the DC-to-DC converter 14 will be turned on so that it begins operating as a switching converter in response to a detecting by the DC-to-DC converter 14 that either: 1) the cord 7 has been plugged into the output connector 5, or 2) the push button 19 has been pressed. The DC-to-DC converter 14 detects these conditions by monitoring the voltage on node 29 and detecting a low pulse (below 0.8 volts for at least 30 milliseconds) of the ENB signal on that node 29.

In addition, the DC-to-DC converter 14 detects if the power cord of the AC-to-DC adapter is plugged into the input connector 2. The DC-to-DC converter 14 has a comparator (not shown) that compares the voltage on the VIN contact 3 to a 4.2 volt reference voltage, and if the voltage on the VIN contact 3 is detected to be higher than 4.2 volts, then a DC power source (for example, an AC-to-DC adapter) is determined to be plugged into input connector 2 of the power bank device 1. If the voltage on the VIN contact 3 is detected not to be higher than the 4.2 volt reference voltage, then it is determined that no DC power source is plugged into the input connector 2. By detecting a change from one condition to the other, the DC-to-DC converter 14 detects when an AC-to-DC adapter is plugged into the input connector 2 and when an AC-to-DC adapter is not plugged into the input connector 2.

In accordance with one novel aspect, the power bank device 1 detects a light load condition as follows. If the DC-to-DC converter 14 is enabled and switching and the magnitude of the average IR current is less than a predetermined amount (for example, less than 50 mA), then the DC-to-DC converter control circuit 23 enables the VDDSGC 14 by de-asserting the signal DIS2 on node and conductor 30. In the nomenclature used here, the signal DIS2 is a disable signal, so a de-asserting of this disable signal on node 30 means that the voltage on node 30 is pulled to ground potential. This de-asserted signal DIS2 causes pull up transistor 31 to be turned on and causes the VBAT voltage from node and conductor 27 to be coupled through the conductive transistor 31 and onto VSUP node and conductor 32. As a result, the circuitry of the VDDSGC 14 is powered up and enabled. The VDDSGC 14 includes a Voltage Reference Generator and Current Source Circuit (VRGCSC) 33, a comparator 34, and a timer circuit 35. A reference voltage generator portion 42 (see FIG. 3) of the VRGCSC 33 outputs a VTH reference voltage (for example, 5.4 volts) onto node 36 and the inverting input lead 37 of the comparator 34. The non-inverting input lead 38 of the comparator 34 is coupled to the VOUT node 39 as shown. Accordingly, the signal COUT as output by the comparator 34 will be a digital high (the VSUP voltage) if the voltage on the VOUT node is higher than VTH, whereas the signal COUT will be a digital low (ground potential) if the voltage on the VOUT node is lower than VTH. The timer circuit 35 detects if COUT is at the high digital value (VSUP) and stays at this level for a predetermined amount of time TD. In one example, TD is 10 milliseconds. If the timer circuit 35 detects this condition, then the timer circuit 35 asserts the DIS1 signal to be digital high value, otherwise the timer circuit 35 drives the DIS1 signal to be a digital low value. If the DIS1 signal is asserted to a digital high value, then the DC-to-DC converter 14 detects this condition and disables itself. When the DC-to-DC converter 14 is disabled in this way, the DC-to-DC converter 14 stops switching and within a short amount of time capacitor 25 is discharged and the DC-to-DC converter 14 cannot and does not output any current onto the VOUT node 39. The DC-to-DC converter 14 is therefore disabled from supplying any supply current at 5 volts out of the power bank device via the VOUT connector contact 8 of the output connector 5.

When power is initially applied to the VDDSGC 14 due to the DIS2 signal being de-asserted as described above, the current source portion 41 of the VRGCSC 33 is also turned on so that it sources a constant current of ITH (for example, 10 mA). The constant current ITH is supplied by the VRGCSC 33 onto the VOUT node 39. If the load device 6 is only drawing a small current that is less than ITH in a light load condition, and if the current source portion 41 of the VRGCSC 33 begins supplying the ITH constant current onto the VOUT node 39 as described above, then the voltage on the VOUT node 39 will rise, regardless of any attempts by the DC-to-DC converter 14 to regulate the voltage on the VOUT node. As the voltage on node 39 increases from 5.0 volts it will eventually exceed the voltage VTH (for example, 5.4 volts), at which point the comparator 34 asserts the signal COUT. The voltage on the VOUT node 39 continues to rise, until the voltage on the VOUT node reaches the clamp voltage VZ (for example, 5.5 V) of the voltage clamp circuit 16. Further rising of the voltage on the VOUT node is prevented because the voltage clamp circuit 16 conducts current from node 39, through the voltage clamp circuit 16, to the GND node and conductor 28. The voltage on the VOUT node 39 is therefore clamped at the clamp voltage VZ (for example, 5.5V). If the voltage on the VOUT node exceeds the VTH voltage in this way for more than the predetermined amount of time TD, then the timer circuit 35 detects this condition and asserts the DIS1 signal on node 40 to a digital logic high value. Asserting the DIS1 signal on node 40 causes the DC-to-DC converter 14 to be disabled so that it stops switching. As described above, the disabling of the DC-to-DC converter 14 results in the capacitor 25 no longer being charged, and the capacitor 25 is soon discharged. The DC-to-DC converter 14 in this state cannot output current onto the VOUT contact 8 of the output connector 5.

This disabling of the DC-to-DC converter 14 in a detected light load condition prevents unwanted power dissipation and wasted energy in a situation in which the load device 6 should actually not be supplied with any power. If, for example, the load device 6 were left plugged into the power bank device 1, and the power bank device persisted in switching and supplying a light load of current to the load device 6, then the charge on the battery cells 17 and 18 would be drained away. In accordance with one novel aspect, this undesirable discharging of the battery cells is avoided by detecting the light load condition and in response disabling the DC-to-DC converter 14 so that the DC-to-DC converter 14 stops switching and is disabled from driving the VOUT connector contact 8 of the output connector 5 as described above.

Once the DC-to-DC converter 14 has been disabled in this way, the DC-to-DC converter 14 can be enabled again either by: 1) manually pushing the push-button 19, or 2) plugging the USB plug back into the output connector 5 (for example, due to unplugging the plug, and then plugging the plug back into the output connector 5), or 3) plugging the AC power source into the input connector 2 (for example, due to unplugging the AC power source cord and then plugging it back into the input connector 2). If the DC-to-DC converter 14 is enabled by virtue of the push button having been pressed or the output cord having been plugged in then the power bank device 1 responds by starting to operate in the discharging mode, whereas if the DC-to-DC converter 14 is enabled by virtue of the AC adapter having been plugged into the VIN input connector 2, then the power bank device 1 responds by starting to operate in the charging mode.

If the power bank device 1 is operating and the DC-to-DC converter 14 is enabled and on and is switching in the discharging mode, and if the magnitude of average IR current is detected to be greater than 50 mA, then the DC-to-DC converter control circuit 23 drives the DIS2 signal so as to keep the VDDSGC 15 unpowered and off. If after operation in this way in the discharging mode for a while the average IR current is detected to have dropped below 50 mA for a sufficiently long period of time such that the light load condition is detected, then the VDDSGC 15 asserts the DIS1 signal on node 40 thereby disabling the DC-to-DC converter 14.

Figure 2:
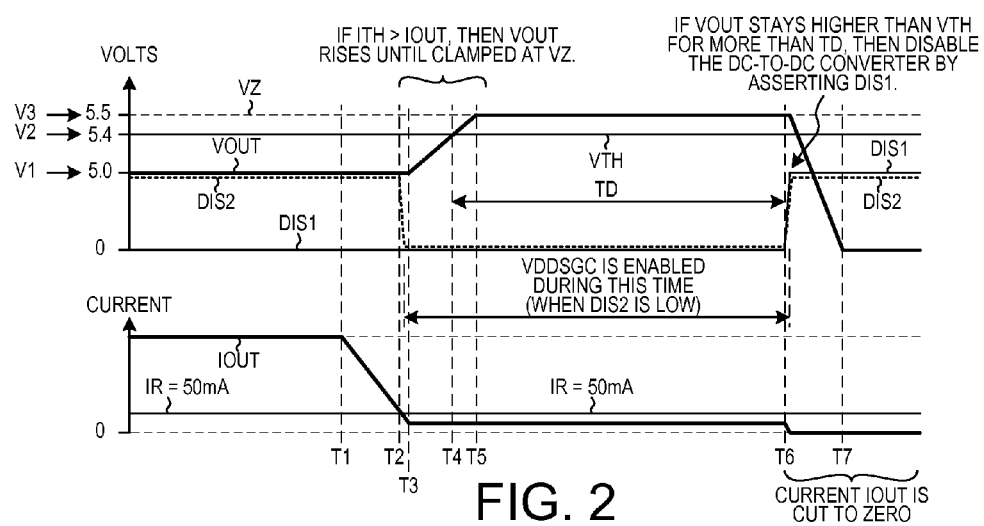
FIG. 2 is a waveform diagram that illustrates how the light load detection circuitry of FIG. 1 detects a light load condition in one example.

FIG. 2 is a waveform diagram that illustrates an operation of the power bank device 1 of FIG. 1. Before time T1, the power bank device is operating in the discharging mode. The DC-to-DC converter 14 is enabled and switching and is driving 5 volts onto the VOUT node 39. The DC-to-DC converter 14 is outputting an average IR current in excess of 50 mA. In a steady state condition, the load device 6 is drawing this same average current in excess of 50 mA out of the output connector. Then, at time T1, the load device 6 stops drawing substantial load current, and the magnitude of the current IOUT drops. When the average IR current drops below 50 mA at time T2, the DC-to-DC converter 14 de-asserts the DIS2 signal. This causes the VDDSGC 15 to be powered up, and causes the current source portion of VRGCSC 33 to start supplying the ITH current (10 mA) onto the VOUT node 39. Because in this example the current draw of the load device 6 falls to be less than ITH by time T3, the voltage on VOUT node 39 begins to rise starting at time T3. When the voltage on VOUT node 39 is detected by the VDDSGC 15 to exceed the VTH voltage (5.4 volts) at time T4, then the comparator 34 asserts the COUT signal and the timer circuit 35 begins timing this condition. After time T4, the voltage on the VOUT node 39 continues rising because the load device is still drawings less load current from VOUT node 39 than the current source is supplying onto VOUT node 39. When the voltage VOUT reaches the clamp voltage VZ (5.5 volts) at time T5, the voltage clamp circuit 16 begins conducting current. Starting at time T5, the voltage on the VOUT node 39 remains clamped at the clamp voltage VZ due to the clamping action of the voltage clamp circuit 16. Throughout this time, the timer circuit 35 has been keeping count of how long the signal COUT has been asserted high. At time T6, the timer circuit 35 detects that COUT has been high, and continuously so, for more than the predetermined amount of time TD. The timer circuit 35 therefore asserts the DIS1 signal at time T6, and this causes the DC-to-DC converter 14 to be disabled. The DC-to-DC converter 14 stops switching, and the DC-to-DC converter 14 causes the DIS2 signal to be asserted. The asserting of the DIS2 signal at time T6 disables the VDDSGC 15. This stops the flow of the ITH current onto the VOUT node 39. Following time T6, due to the DC-to-DC converter 14 being disabled and due to the VDDSGC being unpowered, the voltage on VOUT node 39 slowly drops due to the light load of the load device 6 discharging the output capacitor 25. By time T6 the voltage on the VOUT node 39 has reached zero volts.

Figure 3:
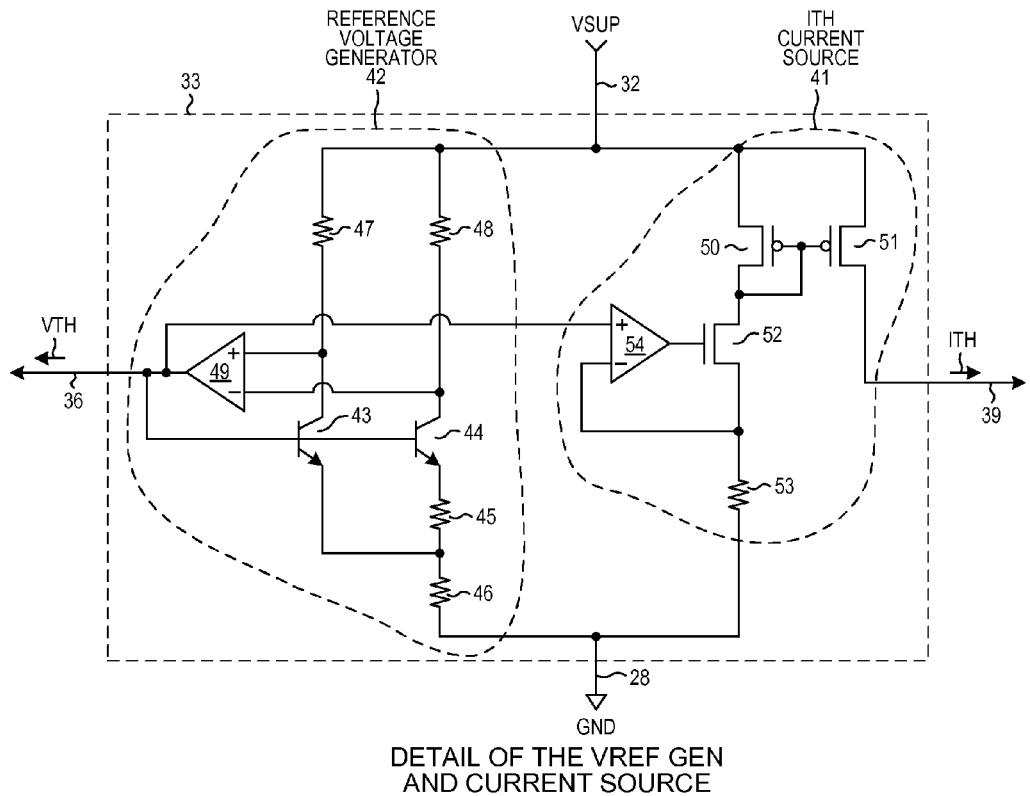
FIG. 3 is a more detailed circuit diagram of the Voltage Reference Generator and Current Source Circuit (VRGCSC) 33 of the power bank device of FIG. 1.

FIG. 3 is a more detailed diagram of one specific example of the Voltage Detector and Disable Signal Generating Circuit (VDDSGC) 15 of FIG. 1. VDDSGC includes the reference voltage generator portion 42 and the ITH current source portion 41. The reference voltage generator portion 42 is a bandgap circuit involving NPN bipolar transistors 43 and 44, resistors 45-48, and a comparator 49. The reference voltage generator circuit 42 supplies the reference voltage VTH onto node 36. The ITH current source portion 41 uses the VTH reference voltage to generate the constant current ITH. The ITH current source portion 41 includes a current mirror involving two N-channel field effect transistors 50 and 51, an N-channel field effect transistor 52, a comparator 54, and a resistor 53, interconnected as shown in FIG. 3. The magnitude of the constant current ITH is set by the magnitude of the reference voltage VTH.

Figure 4:
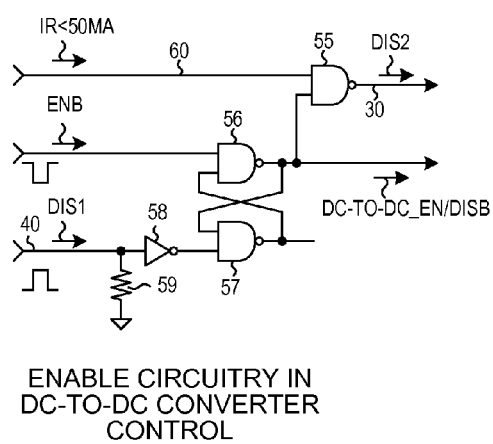
FIG. 4 is a more detailed circuit diagram of enable circuitry in the DC-to-DC converter control circuit 23 of the power bank device of FIG. 1.

FIG. 4 is a diagram of enable circuitry within the DC-to-DC converter control circuit 23 of FIG. 1. The circuitry includes three NAND gates 55-57, an inverter 58, and a pull-down resistor 59. NAND gates 56 and 57 form a cross-coupled latch. The signal DC-TO-DC_EN/DISB is a signal internal to the DC-to-DC converter control circuit 23. If the VDDSGC 15 is unpowered and the output of the timer circuit 35 is not being driven by circuitry of the timer circuit 35, then the resistor 59 pulls the voltage on the input of the inverter 58 down to a digital logic low, thereby preventing an erroneous signal on conductor 40 from changing the state of the cross-coupled latch. If the signal DC-TO-DC_EN/DISB is a digital logic high then the DC-to-DC converter 14 is enabled, whereas if the signal DC-TO-DC EN/DISB is a digital logic low then the DC-to-DC converter 14 is disabled. If initially the DC-to-DC converter 14 is disabled and the DC-TO-DC_EN/DISB signal is low, and the ENB signal pulses low, then the state of the latch will be changed so that the DC-TO-DC_EN/DISB signals transitions high. This will enable the DC-to-DC converter 14. The DC-to-DC converter 14 will stay enabled in this state until the state of the latch is changed by the DIS1 signal being asserted high. If the DC-to-DC converter 14 is in the enabled state and the average current IR is detected to be less than 50 mA as indicated by the signal IR<50 MA being a digital logic high on conductor 60, then the NAND gate 55 asserts the signal DIS2 to have a digital logic low level. This will enable the VDDSGC 15. If, on the other hand, the DC-to-DC converter 14 is in the enabled state and the average current IR is detected not to be less than 50 mA as indicated by the signal IR<50 MA being a digital logic low, then the NAND gate 55 de-asserts the signal DIS2 to have a digital logic high level. This will disable the VDDSGC 15. If the DC-to-DC converter is not enabled as indicated by the state of the signal DC-TO-DC_EN/DISB being a digital logic low, then NAND gate 55 will output a digital logic high and the VDDSGC 15 is not powered. As discussed above, the digital logic value of the signal DIS2 determines whether the VDDSGC 15 is powered or not.

Figure 5:
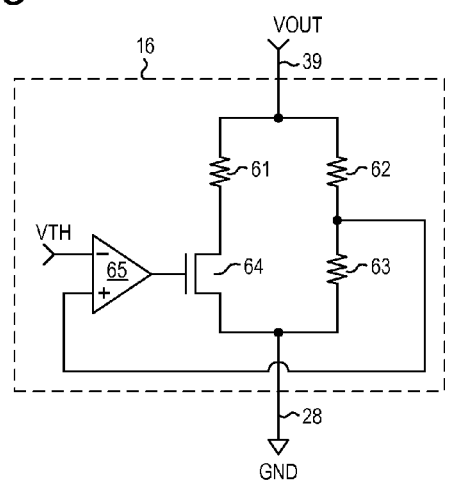
FIG. 5 is a more detailed circuit diagram of the voltage clamp circuit 16 of the power bank device of FIG. 1.

FIG. 5 is a diagram of one example of the voltage clamp circuit 16 of FIG. 1. The circuit includes three resistors 61-63, an N-channel transistor 64, and a comparator 65.

Figure 6:
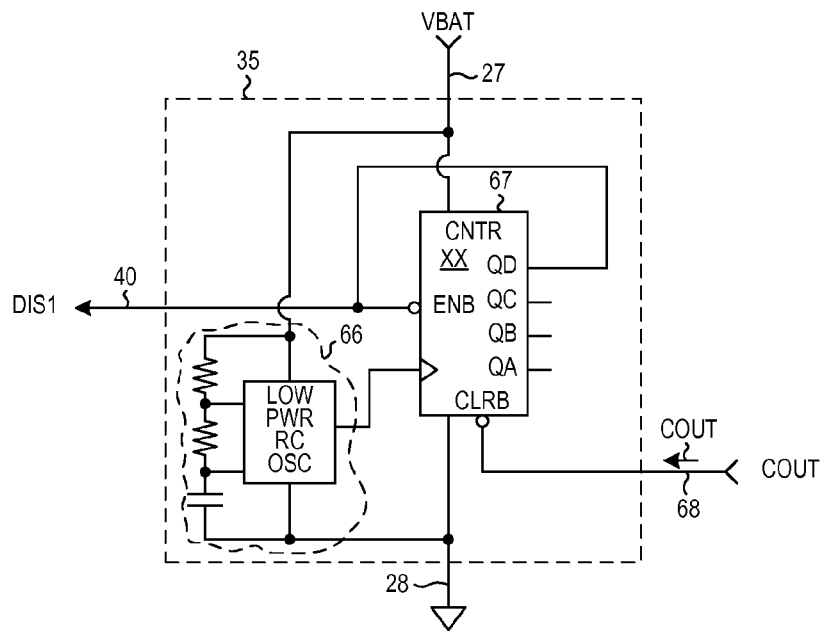
FIG. 6 is a more detailed circuit diagram of the timer 35 of the power bank device of FIG. 1.

FIG. 6 is a diagram of one example of the timer circuit 35 of FIG. 1. The timer circuit 35 includes a low power RC oscillator circuit 66 and a digital counter 67. If the digital signal COUT as output by the comparator 34 is low, then the sign on the asynchronous active low clear input CLRB of the digital counter 67 is low, and the counter 67 will be cleared to a value of "0000", regardless of the digital logic value on the other inputs of the counter. If the COUT signal then transitions to a digital logic high, then the counter 67 will begin counting. The low power RC oscillator circuit 66 supplies a digital clock signal onto the clock input of the counter. Because the count is initially "0000", the QD bit of the counter outputs a digital "0", and the signal on the active low count enable input ENB of the counter is low. The counter is therefore enabled to count. If COUT stays high long enough that the QD bit transitions to output a digital "1", then the counter 67 stops counting and the signal DIS1 is asserted high. If, on the other hand, the signal COUT transitions low before the counter 67 has counted far enough that the QD bit outputs a digital "1", then the counter 67 will be reset to a count of "0000". The frequency of the clock signal and the number of bits in the counter 67 are selected to set the desired time period TD.

Figure 7:
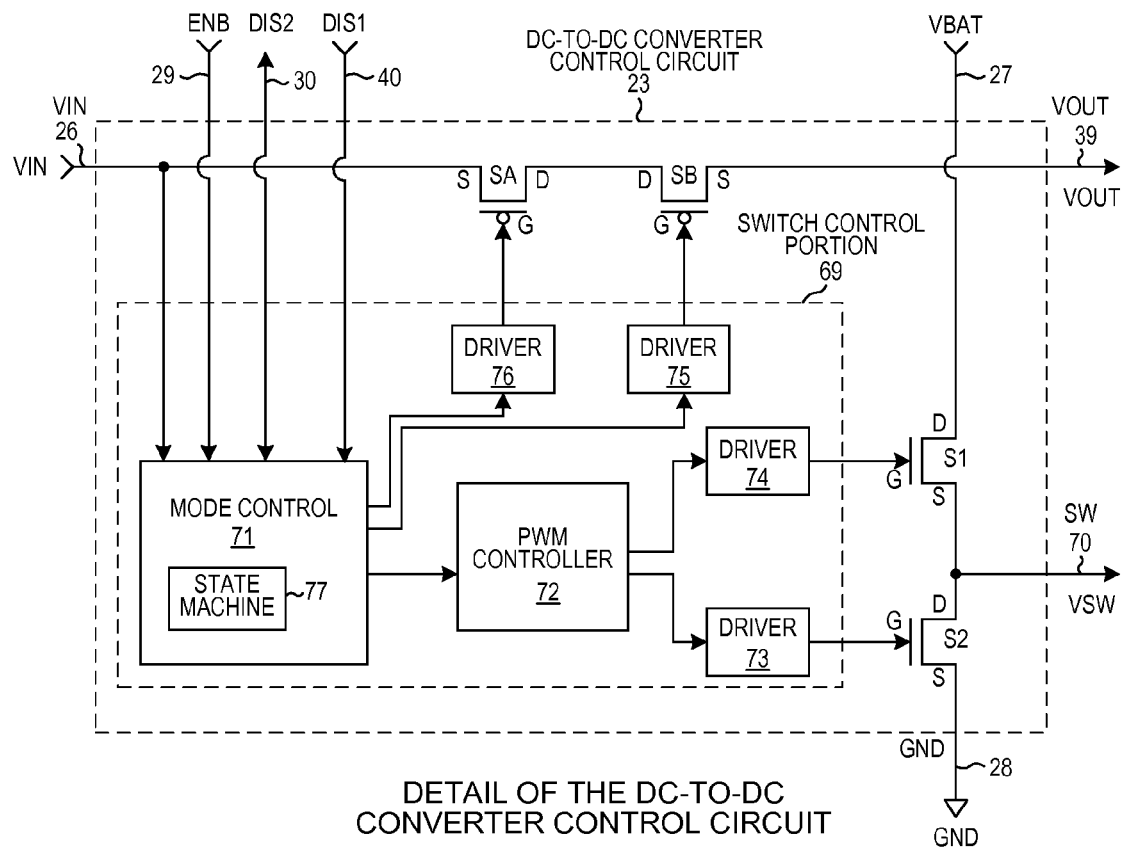
FIG. 7 is a more detailed block diagram of the DC-to-DC converter control circuit 23 of the power bank device of FIG. 1.

FIG. 7 is a more detailed diagram of the DC-to-DC converter control circuit 23 of FIG. 1. DC-to-DC converter control circuit 23 includes a switch control portion 69 and four power field effect transistors S1, S2, SA and SB. The mode control block 71 includes the circuit of FIG. 4, circuitry for detecting an AC adapter being plugged into the input conductor 2, as well as a state machine 77. In addition to the mode control block 71, the switch control portion 69 includes a pulse-width modulation controller 72, and four MOSFET driver circuits 73-76. The SA and SB transistors, if turned on, form a bypass current path from the VIN contact 3 of the input terminal 2 and to the VOUT contact 8 of the output terminal 5. Although the SA and SB transistors are shown as P-channel field effect transistors in the example of FIG. 7, the SA and SB transistors could alternatively be N-channel field effect transistors. Series-coupled transistors SA and SB can be either P-channel or N-channel devices provided that either the sources of the two transistors are coupled together, or the drains of the two transistors are coupled together. In the diagram, the source of a transistor is denoted with a "S", the drain of a transistor is denoted with a "D", and the gate of a transistors is denoted with a "G".

Figure 8:
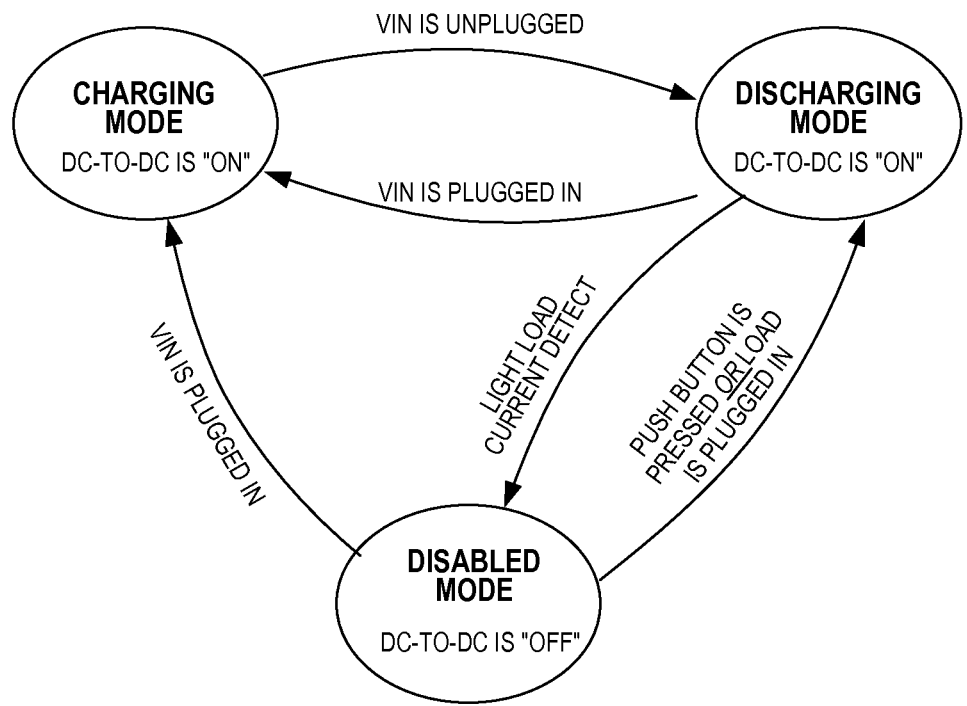
FIG. 8 is a state diagram for the state machine within the DC-to-DC converter control circuit 23 of the power bank device of FIG. 1.

FIG. 8 is a state diagram for the state machine in the mode control block 71 of FIG. 7. The state machine 77 is made of sequential and combinatorial digital logic elements, where the state is stored in sequential logic elements, and where transitions between states are prompted by changes in digital control signals as indicated on the state diagram. The state machine 77 powers up in to the DISABLED mode. In this mode the DC-to-DC converter 14 is disabled and is not switching. If when the state machine 77 is in the DISABLED mode the mode control block 71 detects that an AC adapter has been plugged into the VIN input conductor 2, then the state changes to the CHARGING mode. If when the state machine 77 is in the DISABLED mode the mode control block 71 detects that the push button 19 has been pressed or that a load has been plugged into the COUT output connector 5, then the state changes to the DISCHARGING mode. Similarly, if the state machine is in the DISCHARGING mode, and then the mode control block 71 detects that an AC adapter has been plugged into the VIN input conductor 2, then the state changes to the CHARGING mode. Accordingly, if the circuit detects that an adequately high voltage is present on the VIN input conductor (indicating an AC adapter is plugged into the VIN input conductor), then the state machine 77 is in the CHARGING mode. If the state machine is in the DISCHARGING mode and then a light load current condition is detected as described above, then the state changes to the DISABLED mode.

FIG. 9 is a simplified diagram of the power bank device 1 of FIG. 1 that illustrates the built-in diodes within the four power field effect transistors S1, S2, SA and SB. In one example, transistor SA is a P-channel field effect transistor that has a built-in diode, the anode A of which is coupled to the VIN node 26 and the cathode C of which his coupled to transistor SB. Likewise, transistor SB is a P-channel field effect transistor that has a built-in diode, the anode A of which is coupled to transistor SA, and the cathode C of which is coupled to the VOUT node 39. Each of transistors S1 and S2 are N-channel field effect transistors, each having its own built-in diode. The anodes of the built-in diodes are identified in the figure by the letter "A", whereas the cathodes of the built-in diodes are identified in the figure by the letter "C".

FIG. 10 is a table that shows how the transistors S1, S2, SA and SB of FIG. 9 are controlled in the various modes of operation. In the discharging mode, transistors S1 and S2 of the circuit of FIG. 9 are ordinarily pulse-width modulated on and off to operate in a buck mode such that the higher voltage VBAT on VBAT node 27 is bucked down to the desired 5.0 volt VOUT voltage on VOUT node 39. The voltage VBAT should be between the battery fully charged operating voltage VBATH (8.7 volts) and less in the case of batteries that need charging, but the voltage VBAT should not be allowed to go below the battery fully uncharged operating voltage VBATL (5.6 volts). In the discharging mode, once the voltage VBAT has decreased down to 5.6 volts, the discharging operation is stopped to avoid further discharging of the batteries below the 5.6 volts VBATL voltage. Accordingly, if VBAT is less than 5.6 volts, then the pulse-width modulating of the S1 and S2 transistors is stopped, and transistors SA and SB are also turned off.

During ordinary battery discharging in the discharging mode, however, current flows in the direction from the SW node 70, through the inductor 24, and to the VOUT node 39 and VOUT contact 8, and out of the power bank device 1 from the VOUT contact 8. The pulse-width modulation of transistors S1 and S2 is controlled during discharging so that the voltage on the VOUT node 39 and VOUT contact 8 is voltage regulated to be 5.0 volts. To protect against the VIN contact 3 of the input conductor 2 being erroneously driven with a low voltage less than 5.0 volts or being erroneously grounded, the SB transistor is turned off. In such a case, the built-in diode 78 of the SB transistor is reverse biased and the switch portion of transistor SB is off, so current is blocked from flowing from the VOUT node 39, through the S1 and S2 transistors, and to the VIN conductor 26 and VIN contact 3.

In the charging mode, the S1 and S2 transistors are ordinarily pulse-width modulated on and off to operate in a boost mode such that a regulated constant current flows in the opposite direction (opposite to the IR current flow in the discharging mode) through the inductor 24. Current flows from the VIN contact 3 and VIN conductor 26, through transistor SA, through transistor SB to the VOUT node, and through the inductor 24 to the SW node 70, and then through the VBAT node 27 to the charging batteries 17 and 18. Provided that VBAT is 5.6 volts or higher, the transistors S1 and S2 are pulse-width modulated in this way. Accordingly, if the transistors S1 and S2 are pulse-width modulated and operating in the boost mode, then the VIN voltage is always lower than the VBAT voltage during battery charging. In the preferred example, VIN is 5.0 volts, and the VBAT voltage ranges from the fully uncharged battery operating voltage VBATL to the fully charged battery operating voltage VBATH. As the batteries 17 and 18 are charged under this constant and regulated charging current IVBAT, the voltage VBAT on the VBAT node 27 increases until it reaches the VBATH voltage of 8.7 volts. During battery charging in this charging mode, the SA and SB transistors are both turned on so that a bypass current path is also provided from the 5.0 volt VIN contact 3 and VIN node and conductor 26, through the transistor SA, through the transistor SB, to out the VOUT node 39, and through the VOUT contact 8, and to the load device 6. Accordingly, at the same time that power from the VIN node is being used to charge the batteries, the VIN node is also used simultaneously to supply current at 5.0 volts through the SA and SB transistors to the VOUT contact 8 of the output connector, and to the load device 6. After a period of battery charging in this way in the charging mode, the batteries become fully charged to the VBATH voltage of 8.7 volts, and at this time the pulse-width modulation of the S1 and S2 transistors is throttled back or stopped altogether to avoid overcharging the batteries.

During proper normal operation of the power bank device, the battery voltage VBAT is maintained in its proper range between VBATL (5.6 volts) and VBATH (8.7 volts) as mentioned above. It is possible, however, that the battery voltage VBAT may fall undesirably low such that VBAT is lower than the 5.6 volts. VBAT may even fall lower than the 5.0 volts present on the VIN contact. In such a case, the transistors S1 and S2 are not being pulse-width modulated on and off, but rather the transistors S1, S2, SA and SB are all controlled to be off. Transistor SA and its built-in diode 79 prevent short circuit current in such a case from flowing from the 5.0 volts on the VIN contact 3 and node 26 to the possibly lower voltage on the VBAT node 27 due to over-depleted batteries (whose VBAT voltage is less than 5.0 volts).

Figure 11:
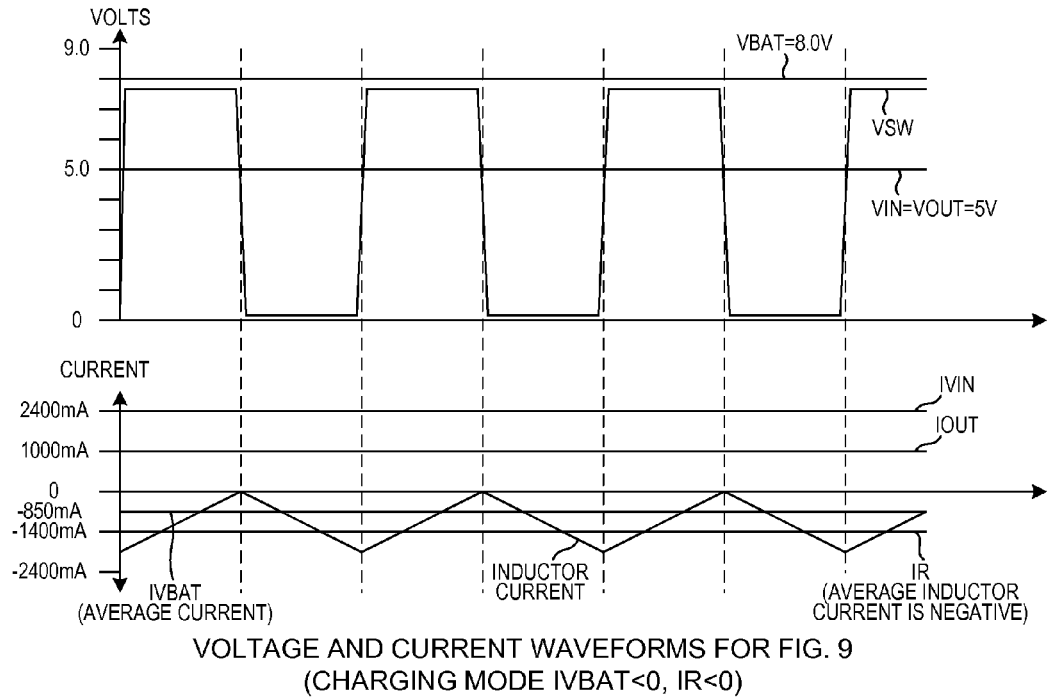
FIG. 11 is a waveform diagram that illustrates operation of the circuit topology of FIG. 9 in the charging mode.

FIG. 11 is a diagram that illustrates voltage and current waveforms for the power bank device of FIG. 9 when it is operating in the CHARGING mode.

Figure 12:
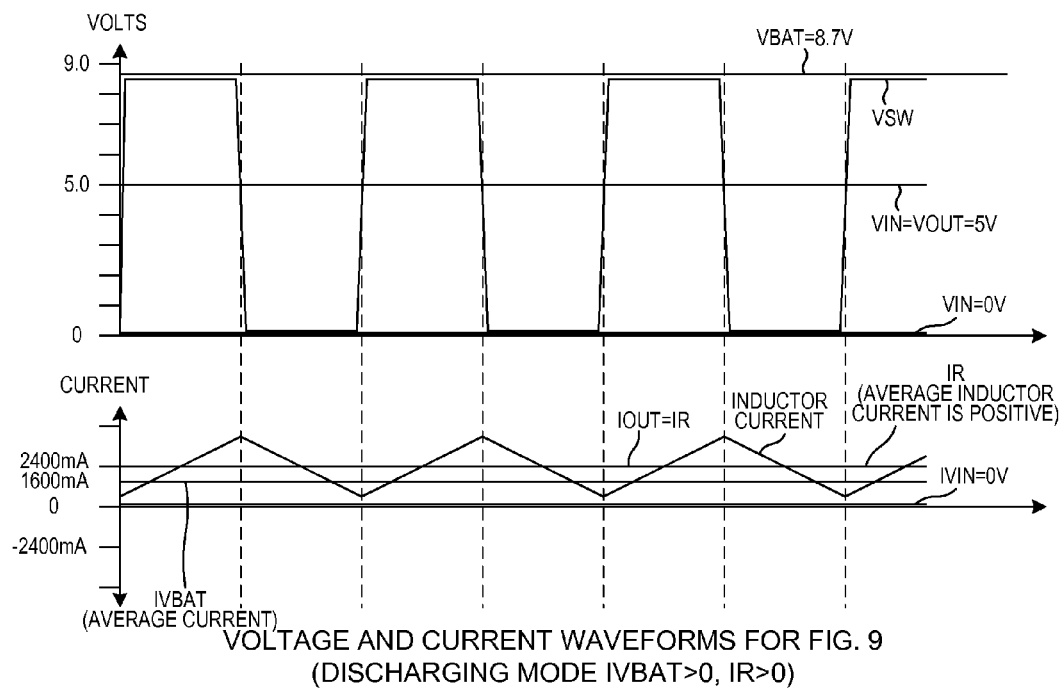
FIG. 12 is a waveform diagram that illustrates operation of the circuit topology of FIG. 9 in the discharging mode.

FIG. 12 is a diagram that illustrates voltage and current waveforms for the power bank device of FIG. 9 when it is operating in the DISCHARGING mode.

Figures 13, 14:
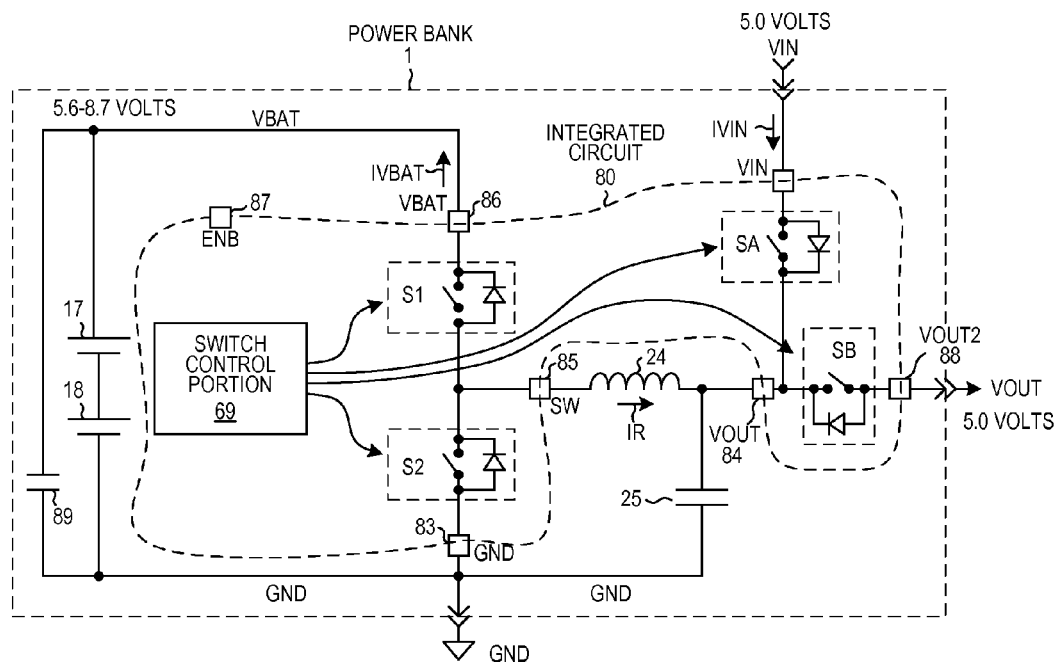
FIG. 13 is a circuit diagram of a second circuit topology in accordance with the second novel aspect.
FIG. 14 is a table that illustrates how the transistors of the second circuit topology of FIG. 13 are controlled.

FIG. 13 is a simplified diagram of another embodiment of the power bank device 1 of FIG. 1. In this embodiment, the integrated circuit 80 has an additional integrated circuit terminal VOUT2 88.

FIG. 14 is a table that shows how the transistors S1, S2, SA and SB of FIG. 13 are controlled in the various modes of operation.

Figures 15, 16:
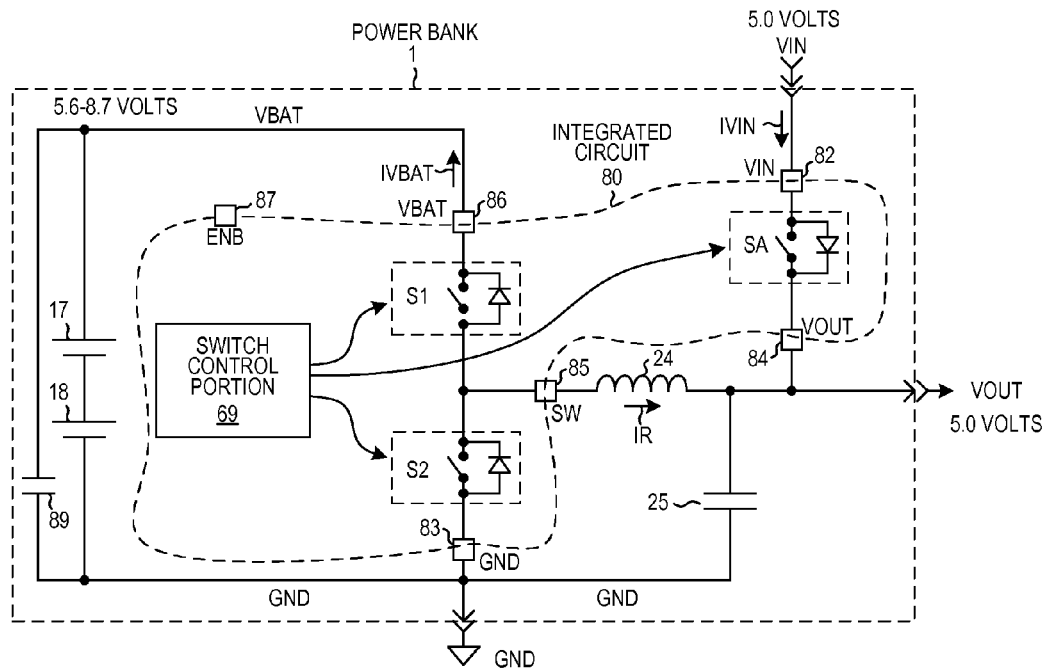
FIG. 15 is a circuit diagram of a third circuit topology in accordance with the second novel aspect.
FIG. 16 is a table that illustrates how the transistors of the third circuit topology of FIG. 15 are controlled.

FIG. 15 is a simplified diagram of another embodiment of the power bank device 1 of FIG. 1.

FIG. 16 is a table that shows how the transistors S1, S2, SA and SB of FIG. 15 are controlled in the various modes of operation.

Figure 17:
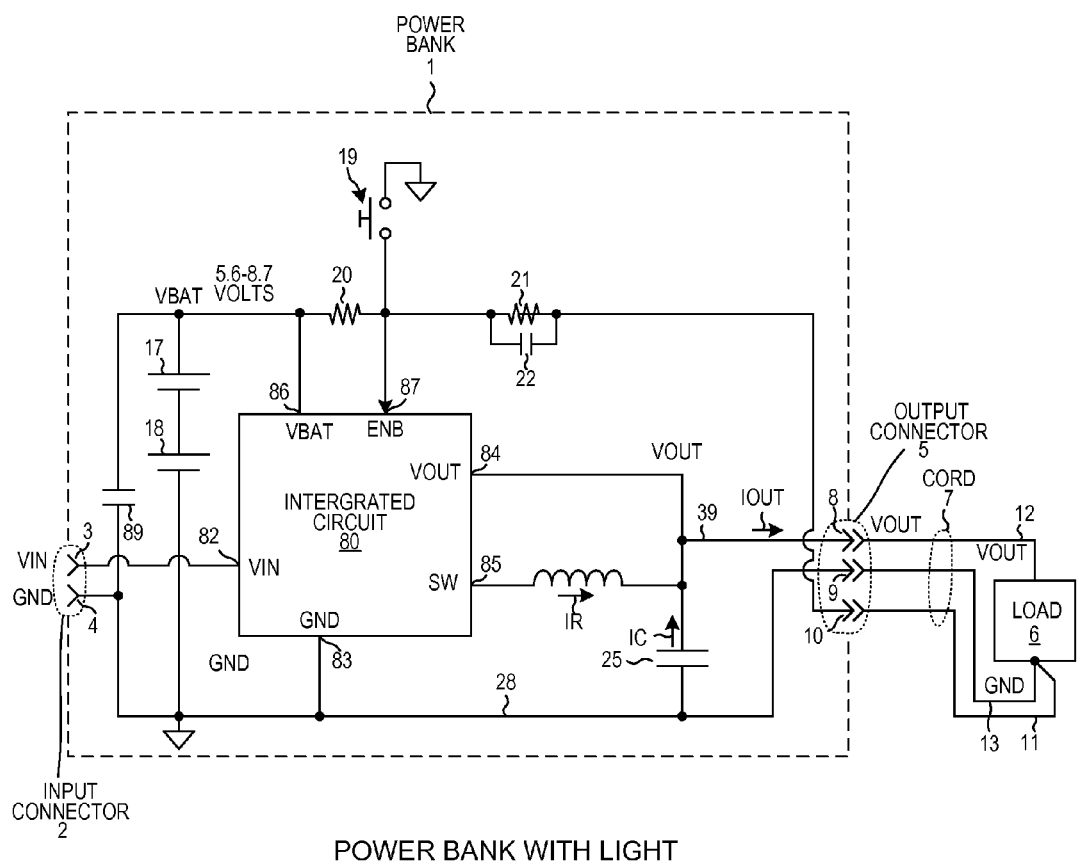
FIG. 17 is a circuit diagram of a power bank device that includes a novel integrated circuit, where the novel integrated circuit includes a DC-to-DC converter control circuit, four power transistors, as well as novel light load detection circuitry.

FIG. 17 is a diagram of an embodiment of the power bank device 1 of FIG. 1, in which all of the circuitry of FIG. 1, except for components 2, 5, 17, 18, 20, 21, 22, 24 and 25, is embodied in a single integrated circuit 80. Specifically, integrated circuit 80 includes the light load detection circuitry 81 of FIG. 1 as well as the DC-to-DC converter control circuit 23 of FIG. 1. Integrated circuit 80 has six integrated circuit terminals: a VIN terminal 82, a GND terminal 83, a VOUT terminal 84, a SW terminal 85, a VBAT terminal 86, and a ENB terminal 87. The terminals 82-87 are also illustrated in FIG. 9.

In accordance with another novel aspect, the light load detection circuitry 81 of FIG. 1 is embodied in a separate, small, and inexpensive "light load detection" integrated circuit, separate from the DC-to-DC converter circuitry of FIG. 1. This light load detection integrated circuit only has a few terminals. The light load detection integrated circuit has a power terminal (for example, the VBAT terminal), a GND terminal, a "node to be tested" terminal (for example, the VOUT terminal), a terminal for outputting a "light load detected" signal (for example, the DIS1 signal), and an optional terminal for receiving a light load detection circuit enable signal (for example, to receive the DIS2 signal of FIG. 1). The light load detection integrated circuit is a general purpose integrated circuit component whose "node to be tested" terminal can be coupled to any five-volt node, a light current leakage from which is to be detected. In one specific embodiment, the light load detection integrated circuit has its own internal power up/power down and low power timer circuitry. The low power timer circuitry runs continuously as long as the integrated circuit is powered from the power and ground terminals, but the low power timer circuitry periodically powers up the remainder of the circuit. The current source is therefore powered up, and the current source supplies the ITH current onto the node to be tested. The VDDSGC then does a test of the node to be tested, and detects if the voltage on the node has risen, and changes the state of the "light load detected signal" as appropriate. After the test, the remainder of the circuit is powered down again, and the cycle repeats. The "light load detected signal" is, however, valid at all times that the integrated circuit is powered. Different versions of the integrated circuit can be made, where each different version has different V1, V2 and V3 values. Alternatively, one or more of the V1, V2 and V3 voltages is programmable using a programming terminal of the integrated circuit, by proper selection of components external to the integrated circuit that are coupled to the programming terminal. The integrated circuit detects an electrical condition on the programming terminal to be one of a plurality of electrical conditions, and from the particular electrical condition detected the integrated circuit determines the particular value of V1, V2 or V3 that is being selected.

Although certain specific embodiments are described above for instructional purposes, the teachings of this patent document have general applicability and are not limited to the specific embodiments described above. Although the VIN contact 3 is illustrated as being part of the VIN node 26 in the simplified example set forth above, in other examples of the novel power bank device there is actually other circuitry (for example, EMI/EMC circuitry or overvoltage protection circuitry) electrically disposed between the VIN node and the VIN contact of the input terminal. Similarly, although the VOUT contact 8 is shown being part of the VOUT node 39 in the simplified example set forth above, in other examples of the novel power bank device there is other circuitry (for example, EMI/EMC circuitry or overvoltage protection circuitry) electrically disposed between the VOUT node and the VOUT contact of the output terminal. For the operation at low frequencies at issue here, the other circuitry does not affect circuit operation and so the VIN contact 3 is said to be coupled to and a part of the VIN node 26 even though in the strictest sense it may not be, and the contact 8 is said to be coupled to and a part of the VOUT node 39 even though in the strictest sense it may not be. In a similar way, there may be other relatively inconsequential circuitry disposed between the other components of the power bank device. Although a particular example of the VDDSGC and voltage clamp circuitry is described above, other circuits that perform the function can be used in other embodiments. For example, in one embodiment, the voltage clamp circuit outputs a signal indicative of whether current is flowing through the clamp. The timer of the VDDSGC has no comparator but rather detects whether current is continuously flowing through the voltage clamp circuit using this output signal from the clamp, and times that signal. If the timing of the clamp output signal indicates that current is continuously flowing through the voltage clamp circuit for more than the predetermined amount of time TD, then the timer asserts the DIS1 signal to the DC-to-DC converter 14. There are also additional circuits for performing the VCCSGC and voltage clamp functions. Accordingly, various modifications, adaptations, and combinations of various features of the described embodiments can be practiced without departing from the scope of the invention as set forth in the claims.

What is claimed is:

1. A power bank circuit comprising:
   a voltage input (VIN) terminal;
   a voltage output (VOUT) terminal;
   at least one rechargeable battery, wherein the at least one rechargeable battery has an operating voltage range from a fully uncharged operating voltage VBATL to a fully charged operating voltage VBATH, wherein the operating voltage range is between a ground (GND) node and a battery (VBAT) node;
   a first field effect transistor S1 coupled to switch current between the VBAT node and a switch (SW) node;
   a second field effect transistor S2 coupled to switch current between the SW node and the GND node;
   an inductor coupled to conduct current between the SW node and a voltage output (VOUT) node;
   a capacitor having a first lead coupled to the VOUT node and a second lead coupled to the GND node;
   a third field effect transistor SA having a first terminal, a second terminal and a third terminal, wherein the first terminal of transistor SA is coupled to a voltage input (VIN) node;
   a fourth field effect transistor SB having a first terminal, a second terminal and a third terminal, wherein the first terminal of transistor SB is coupled to the second terminal of transistor SA, and wherein the second terminal of transistor SB is coupled to the VOUT node; and a control circuit that controls the transistor S1, the transistor S2, the transistor SA and the transistor SB such that: 1) in a charging boost mode transistors SA and SB are turned on and transistors S1 and S2 are pulse-width modulated on and off so that current flows into the power bank circuit via the VIN terminal, through the VIN node, through the transistor SA and through the transistor SB to the VOUT node, and so that an average current flows in the inductor from the VOUT node to the SW node and so that a charging current flows through the transistor S1 and through the VBAT node and to the at least one rechargeable battery so as to charge the at least one rechargeable battery, wherein in the charging boost mode the voltage on the VIN node is always smaller than the VBATL voltage, and wherein in the charging boost mode a current also flows from the VOUT node and through the VOUT terminal and out of the power bank circuit; 2) in a discharging buck mode transistors SA and SA are turned off and transistors S1 and S2 are pulse-width modulated on and off so that current flows out of the at least one rechargeable battery, through the VBAT node, through the transistor S1 to the SW node, and through the inductor to the VOUT node, and out of the power bank circuit via the VOUT terminal, wherein in the discharging buck mode the voltage on the VBAT node is always higher than the voltage on the VOUT terminal.

2. The power bank circuit of claim 1, wherein the control circuit also controls the transistors S1, S2, SA and SB such that: 3) in a disabled mode transistors SA, SB, S1 and S2 are turned off.

3. The power bank circuit of claim 1, wherein transistors SA and SB are both P-channel field effect transistors.

4. The power bank circuit of claim 1, wherein transistors SA and SB are both N-channel field effect transistors.

5. The power bank circuit of claim 1, wherein the first terminal of transistor SB is a source terminal, and wherein the second terminal of transistor SA is a source terminal.

6. The power bank circuit of claim 1, wherein the first terminal of transistor SB is a drain terminal, and wherein the second terminal of transistor SA is a drain terminal.

7. The power bank circuit of claim 1, wherein transistor SA has a built-in diode, wherein an anode of the built-in diode of transistor SA is coupled to the first terminal of transistor SA, wherein a cathode of the built-in diode of transistor SA is coupled to the second terminal of transistor SA, wherein transistor SB has a built-in diode, wherein a cathode of the built-in diode of transistor SB is coupled to the first terminal of transistor SB, wherein an anode of the built-in diode of transistor SB is coupled to the second terminal of transistor SB.

8. The power bank circuit of claim 1, wherein transistor SA has a built-in diode, wherein a cathode of the built-in diode of transistor SA is coupled to the first terminal of transistor SA, wherein an anode of the built-in diode of transistor SA is coupled to the second terminal of transistor SA, wherein transistor SB has a built-in diode, wherein an anode of the built-in diode of transistor SB is coupled to the first terminal of transistor SB, and wherein a cathode of the built-in diode of transistor SB is coupled to the second terminal of transistor SB.

9. The power bank circuit of claim 1, wherein approximately five volts is present on the VIN terminal when the power bank device is operating in the charging boost mode, wherein said at least one rechargeable battery comprises two series-connected lithium-ion cells, and wherein the voltage VBATL is greater than five volts.

10. The power bank circuit of claim 1, wherein the control circuit and the transistors SA, SB, S1 and S2 are parts of a single integrated circuit, and wherein the inductor and the capacitor are not parts of the integrated circuit.

11. The power bank circuit of claim 1, wherein in the discharging buck mode the transistors S1 and S2 stop switching if the voltage on the VBAT node drops below a predetermined voltage.

12. The power bank circuit of claim 1, wherein in the charging boost mode the transistors S1 and S2 stop switching if the voltage on the VBAT node rises to a predetermined voltage.

13. The power bank circuit of claim 1, wherein the control circuit comprises mode control logic, a pulse-width modulation controller, and a plurality of field effect transistor driver circuits, wherein the mode control logic comprises a state machine, wherein if the state machine is operating in a first state then the control circuit controls the transistors S1, S2, SA and SB to operate in the charging boost mode whereas if the state machine is operating in a second state then the control circuit controls the transistors S1, S2, SA and SB to operate in the discharging buck mode.

14. A method comprising:
(a) in a discharging mode receiving a supply current from at least one battery via a battery voltage (VBAT) terminal of an integrated circuit and switching current through a switch (SW) terminal of the integrated circuit and through an external inductor external to the integrated circuit such that a regulated output voltage VOUT is present on an output node VOUT, wherein the inductor is coupled between the switch (SW) terminal of the integrated circuit and the output node VOUT, wherein a voltage on the VBAT terminal during operation in the discharging mode is greater than the regulated output voltage VOUT, and wherein during operation in the discharging mode the integrated circuit and the external inductor operate as a buck DC-to-DC switching converter; and
(b) in a charging mode receiving a supply current onto an input voltage (VIN) terminal of the integrated circuit and causing a current to flow through the external inductor such that a current-regulated charging current flows out of the VBAT terminal of the integrated circuit and into said at least one battery, wherein during operation in the charging mode a voltage on the VIN terminal is smaller than a voltage on the VBAT terminal, wherein during operation in the charging mode the integrated circuit and the external inductor operate as a boost DC-to-DC switching converter, wherein during operation in the charging mode a current flows from the VIN terminal, through a bypass current path within the integrated circuit, and out of a voltage output (VOUT) terminal of the integrated circuit, and wherein the VOUT terminal of the integrated circuit is coupled to the VOUT output node.

15. The method of claim 14, further comprising:
(c) in a disabled mode preventing any current flow from said at least one battery into the VBAT terminal of the integrated circuit and disabling any switching of current flow either into or out of the SW terminal of the integrated circuit, wherein in the disabled mode the integrated circuit and the external inductor operate neither as a buck DC-to-DC switching converter nor as a boost DC-to-DC switching converter.

16. The method of claim 15, further comprising:
(d) receiving an enable signal onto an enable input terminal of the integrated circuit and in response causing the integrated circuit to stop operating in the disabled mode and to start operating in the discharging mode.

17. The method of claim 14, wherein the integrated circuit comprises a first power transistor S1 coupled to conduct current between the VBAT terminal and the SW terminal, wherein the integrated circuit further comprises a second power transistor S2 coupled to conduct current between the SW terminal and a ground GND terminal of the integrated circuit, wherein the integrated circuit further comprises a third power transistor SA and a fourth power transistor SB that are coupled together in series between the VIN terminal and the VOUT terminal, wherein the transistor SA has a built-in diode, wherein the transistor SB has a built-in diode, and wherein a cathode of the built-in diode of transistor SA is coupled to a cathode of the built-in diode of transistor SB.

18. The method of claim 17, further comprising:
(d) pulse-width modulating the transistors S1 and S2 on and off when the integrated circuit is operating in the discharging mode but controlling the transistors SA and SB to be off when the integrated circuit is operating in the discharging mode;
(e) pulse-width modulating the transistors S1 and S2 on and off when the integrated circuit is operating in the charging mode but controlling the transistors SA and SB to be on when the integrated circuit is operating in the charging mode; and
(f) controlling the transistors S1, S2, SA and SB to be off when the integrated circuit is operating in the disabled mode.

19. A power bank circuit comprising:
a voltage input (VIN) terminal;
a voltage output (VOUT) terminal;
at least one rechargeable battery, wherein the at least one rechargeable battery has an operating voltage range from a fully uncharged operating voltage VBATL to a fully charged operating voltage VBATH, wherein the operating voltage range is between a ground (GND) node and a battery (VBAT) node;
a first field effect transistor S1 coupled to switch current between the VBAT node and a switch (SW) node;
a second field effect transistor S2 coupled to switch current between the SW node and the GND node;
an inductor coupled to conduct current between the SW node and a voltage output (VOUT) node;
a capacitor having a first lead coupled to the VOUT node and a second lead coupled to the GND node;
a third field effect transistor SA having a first terminal, a second terminal and a third terminal, wherein the first terminal of transistor SA is coupled to a voltage input (VIN) node;
a fourth field effect transistor SB having a first terminal, a second terminal and a third terminal, wherein the first terminal of transistor SB is coupled to the second terminal of transistor SA, and wherein the second terminal of transistor SB is coupled to the VOUT node; and
means for controlling the transistor S1, the transistor S2, the transistor SA and the transistor SB such that: 1) in a charging boost mode transistors SA and SB are turned on and transistors S1 and S2 are pulse-width modulated on and off so that current flows into the power bank circuit via the VIN terminal, through the VIN node, through the transistor SA and through the transistor SB to the VOUT node, and so that an average current flows in the inductor from the VOUT node to the SW node and so that a charging current flows through the transistor S1 and through the VBAT node and to the at least one rechargeable battery so as to charge the at least one rechargeable battery, wherein in the charging boost mode the voltage on the VIN node is always smaller than the VBATL voltage, and wherein in the charging boost mode a current also flows from the VOUT node and through the VOUT terminal and out of the power bank circuit; 2) in a discharging buck mode transistors SA and SA are turned off and transistors S1 and S2 are pulse-width modulated on and off so that current flows out of the at least one rechargeable battery, through the VBAT node, through the transistor S1 to the SW node, and through the inductor to the VOUT node, and out of the power bank circuit via the VOUT terminal, and wherein in the discharging buck mode the voltage on the VBAT node is always higher than the voltage on the VOUT terminal.

20. The power back circuit of claim 19, wherein the means comprises a mode control logic circuit, a pulse-width modulation controller, and a plurality of transistor drivers, and wherein the mode control logic circuit comprises a state machine.

\* \* \* \* \*